(12) United States Patent
Yang

(10) Patent No.: US 11,314,682 B2
(45) Date of Patent: Apr. 26, 2022

(54) SWITCHABLE I2S INTERFACE

(71) Applicant: NUVOTON TECHNOLOGY CORPORATION, Hsinchu (TW)

(72) Inventor: Chang-Shen Yang, Hsinchu Science Park (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 16/729,044

(22) Filed: Dec. 27, 2019

(65) Prior Publication Data
US 2020/0210368 A1    Jul. 2, 2020

(30) Foreign Application Priority Data
Dec. 27, 2018  (TW) ................................ 107147326

(51) Int. Cl.
| G06F 13/42 | (2006.01) |
| G06F 3/16 | (2006.01) |
| G06F 5/06 | (2006.01) |

(52) U.S. Cl.
CPC .......... *G06F 13/4282* (2013.01); *G06F 3/162* (2013.01); *G06F 5/06* (2013.01); *G06F 2213/0016* (2013.01)

(58) Field of Classification Search
None
See application file for complete search history.

(56) References Cited

U.S. PATENT DOCUMENTS

| 6,657,574 B1* | 12/2003 | Rhode | H03M 1/1205 |
| | | | 341/141 |
| 7,295,578 B1* | 11/2007 | Lyle | G06F 3/14 |
| | | | 348/473 |
| 9,142,207 B2* | 9/2015 | Hendrix | G10K 11/17854 |
| 9,955,250 B2* | 4/2018 | Hendrix | G10K 11/17854 |
| 10,152,960 B2* | 12/2018 | Hendrix | G10K 11/17881 |
| 10,649,945 B1* | 5/2020 | Geerling | G06F 13/4068 |
| 10,714,072 B1* | 7/2020 | Bodon | H04R 1/1041 |
| 2004/0068535 A1 | 4/2004 | Subbiah et al. | |

(Continued)

FOREIGN PATENT DOCUMENTS

| CN | 100387057 C | 5/2008 |
| TW | 552810 | 9/2003 |
| TW | 201633164 | 9/2016 |

*Primary Examiner* — Henry Tsai
*Assistant Examiner* — Christopher A Bartels
(74) *Attorney, Agent, or Firm* — Muncy, Geissler, Olds & Lowe, P.C.

(57) ABSTRACT

A switchable I2S interface including a multiplexer, a switchable FIFO memory and a switchable shift register, is disclosed. The multiplexer receives a transmission instruction or a receiving instruction, and configured to generate a switching signal according to the received instruction. The switchable FIFO memory is connected to the multiplexer and receives the switching signal, and comprise a transmission control circuit and a receiving control circuit. According to the switching signal, the switchable FIFO memory switches on the transmission control circuit to transmit the audio output signal, or switches on the receiving control circuit to receive the audio input signal. The switchable shift register is connected to the switchable FIFO memory, and receives and temporarily stores the audio output signal and the audio input signal.

6 Claims, 5 Drawing Sheets

(56) References Cited

U.S. PATENT DOCUMENTS

| | | | |
|---|---|---|---|
| 2004/0161040 A1* | 8/2004 | Schreiber | G06F 3/162 375/242 |
| 2005/0283589 A1* | 12/2005 | Matsuo | G06F 9/30101 712/217 |
| 2008/0287063 A1* | 11/2008 | Kidron | G10L 19/167 455/41.2 |
| 2010/0238003 A1* | 9/2010 | Chan | G01D 4/004 340/538 |
| 2011/0265134 A1* | 10/2011 | Jaggi | H04N 21/440218 725/109 |
| 2011/0276975 A1* | 11/2011 | Brown | G06F 3/162 718/103 |
| 2014/0105415 A1* | 4/2014 | Jain | G08C 19/00 381/77 |
| 2015/0256613 A1* | 9/2015 | Walker | H04L 43/087 709/217 |
| 2017/0220502 A1* | 8/2017 | Kessler | G06F 13/404 |
| 2018/0220175 A1* | 8/2018 | Kang | H04N 21/8451 |
| 2019/0103914 A1* | 4/2019 | Junk | H04L 69/08 |
| 2019/0173582 A1* | 6/2019 | Ashrafi | H01Q 25/005 |
| 2020/0106743 A1* | 4/2020 | Park | H04L 63/308 |

* cited by examiner

SWITCHABLE I2S INTERFACE

CROSS REFERENCE TO RELATED APPLICATION

This application claims the priority benefit of Taiwan application no. 107147326, filed on Dec. 27, 2018. The entirety of the above-mentioned patent application is hereby incorporated by reference herein and made a part of this specification.

BACKGROUND OF THE INVENTION

Field of the Invention

The present invention relates to an I2S interface, more particularly to a switchable I2S interface capable of using a multiplexer to generate a switching signal according to a transmission instruction or a receiving instruction, so as to enable a switchable FIFO memory to switch on a transmission control circuit or a receiving control circuit according to the switching signal.

Description of the Related Art

The I2S, which is an interface standard for transmitting digital audio data between integrated circuits, can transmit two sets of data (such as left channel data and right channel data) in series. Please refer to FIG. 1, which is a schematic view of a conventional I2S interface. As shown in FIG. 1, each of a transmission first-in first-out memory TXFIFO and a receiving first-in first-out memory RXFIFO can perform unidirectional transmission only, to output an audio signal DOUT from the transmission first-in first-out memory TXFIFO to the transmission shift register Tx Shift, or input an audio signal DIN from a receiving first-in first-out memory RXFIFO to a receiving shift register Rx Shift. The audio signal DIN is an audio signal inputted from a microphone, and the audio signal DOUT is an audio signal transmitted to a speaker. In the occasion where only unidirectional transmission function is performed, for example, only one microphone is used, the other transmission function idles.

In recent years, an electronic product is often installed with multiple microphones, for example, the multiple microphones are disposed in different positions and face different orientations, respectively, so as to receive sound instructions from different directions. However, the receiving first-in first-out memory RXFIFO of the conventional I2S interface can receive signals of two microphones only, and when four microphones are operated at the same time, more than two I2S interfaces are required.

According to above contents, when two or more I2S interfaces are used, the I2S interfaces must be synchronized, and it spends more time to process the synchronization issue between the I2S interfaces and also causes inconvenience in product development.

SUMMARY OF THE INVENTION

An objective of the present invention is to provide a switchable I2S interface, so as to solve the above-mentioned conventional problems.

In order to achieve the objective, the present invention provides a switchable I2S interface comprising a multiplexer, a switchable FIFO memory, and a switchable shift register. The multiplexer is configured to receive a transmission instruction or a receiving instruction, and configured to generate a switching signal according to the received transmission instruction or receiving instruction. The switchable FIFO memory is connected to the multiplexer and configured to receive a switching signal, and includes a transmission control circuit and a receiving control circuit. According to the switching signal, the switchable FIFO memory switches on the transmission control circuit to transmit an audio output signal, or switches on the receiving control circuit to receive an audio input signal. The switchable shift register is connected to the switchable FIFO memory and configured to receive and temporarily store the audio output signal and the audio input signal.

In a preferred embodiment, the switchable shift register is connected to a plurality of audio codecs, each of the plurality of audio codecs transmits the audio input signal to the switchable shift register, or receives the audio output signal from the switchable shift register.

In a preferred embodiment, each of the plurality of audio codecs is an analog-to-digital converter or a digital-to-analog converter.

In a preferred embodiment, the audio input signal or the audio output signal is transmitted between the switchable shift register and one of the plurality of audio codecs at a time point, and the audio input signal or the audio output signal is transmitted between the switchable shift register and another of the plurality of audio codecs at a next time point.

In a preferred embodiment, the switchable FIFO memory is a 32-bit memory, and each of the audio input signal and the audio output signal is 16-bit data, and the switchable FIFO memory selectively receives the two audio input signals or transmits the two audio output signals.

In order to achieve the objective, the present invention provides a switchable I2S interface comprising two multiplexers, two switchable FIFO memories and two switchable shift registers. Each of the two multiplexers is configured to receive a transmission instruction or a receiving instruction, and configured to generate a switching signal according to the received transmission instruction or the receiving instruction. The two switchable FIFO memories are connected to the two multiplexers respectively, and configured to receive the switching signal. Each of the plurality of switchable FIFO memories comprises a transmission control circuit and a receiving control circuit, and according to the switching signal switches on the transmission control circuit to transmit the audio output signal or switches on the receiving control circuit to receive the audio input signal. The two switchable shift registers are connected to the two switchable FIFO memories respectively, and configured to receive and temporarily store the audio output signal and the audio input signal.

In a preferred embodiment, each of the two switchable shift registers is connected to a plurality of audio codecs, and each of the plurality of audio codecs transmits the audio input signal to the switchable shift register corresponding thereto or receives the audio output signal from the switchable shift register corresponding thereto.

In a preferred embodiment, each of the plurality of audio codecs is an analog-to-digital converter or a digital-to-analog converter.

In a preferred embodiment, the audio input signal or the audio output signal is transmitted between one of the two switchable shift registers and one of the plurality of audio codecs at a time point, and the audio input signal or the audio output signal is transmitted between the one of the two switchable shift registers and another of the plurality of audio codecs at a next time point.

In a preferred embodiment, each of the two switchable FIFO memories is a 32-bit memory, and one of the audio input signal and the audio output signal is 16-bit data, and each of the two switchable FIFO memories selectively receives the two audio input signals, or transmits the two audio output signals.

According to above contents, the switchable I2S interface of the present invention can switch the switchable FIFO memory to perform the receiving function or the transmission function upon demand, so as to prevent the first-in first-out memory from idling; furthermore, two audio signals can be transmitted through the same I2S interface, so it is more efficient to synchronize the inputs or outputs of the two audio signals; furthermore, one of the receiving function and the transmission function can be activated by a switching scheme upon demand, so the required amount of the I2S interfaces can be reduced, and the synchronization issue between the different I2S interfaces can be reduced or eliminated, thereby reducing the development time of the I2S interface and reducing device cost.

BRIEF DESCRIPTION OF THE DRAWINGS

The accompanying drawings are included to provide a further understanding of the invention, and are incorporated in and constitute a part of this specification. The drawings illustrate embodiments of the invention and together with the description, serve to explain the principles of the invention.

DESCRIPTION OF EMBODIMENTS

Figure 1:
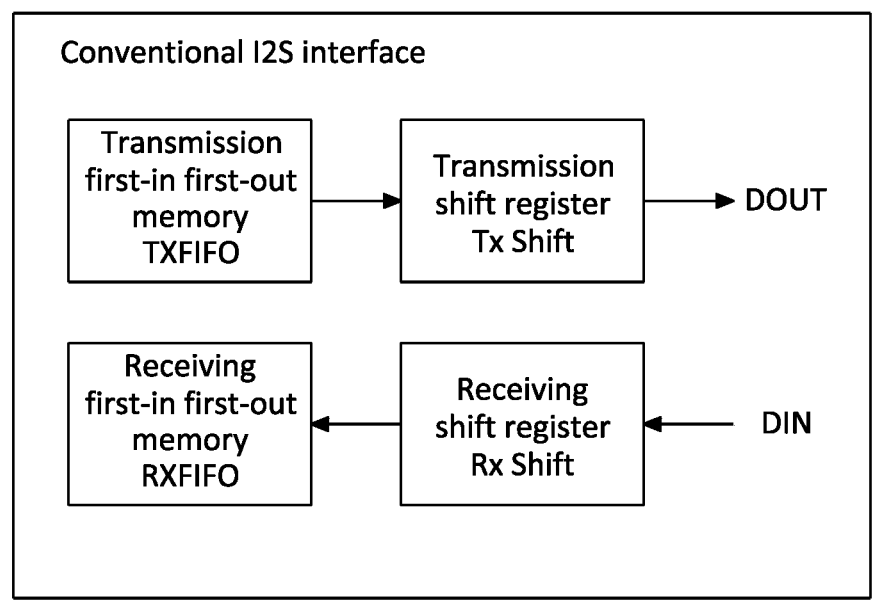
FIG. 1 is a schematic view of a conventional I2S interface.

The following disclosure provides many different embodiments, or examples, for implementing different components of the semiconductor devices provided. Specific examples of components and arrangements are described below to simplify the present disclosure. These are, of course, merely examples and are not intended to be limiting. For example, the formation of a first component over or on a second component in the description that follows may include embodiments in which the first and second components are formed in direct contact, and may also include embodiments in which additional components may be formed between the first and second components, such that the first and second components may not be in direct contact. In addition, the present disclosure may repeat reference numerals and/or letters in the various embodiments. This repetition is for the purpose of simplicity and clarity and does not in itself dictate a relationship between the various embodiments and/or configurations discussed.

Some embodiments are described below. Throughout the various figures and illustrative embodiments, like reference numbers are used to designate like elements. It should be understood that additional operations can be provided before, during, and after the method, and some of the operations described can be replaced or eliminated for other embodiments of the method.

Figure 2:
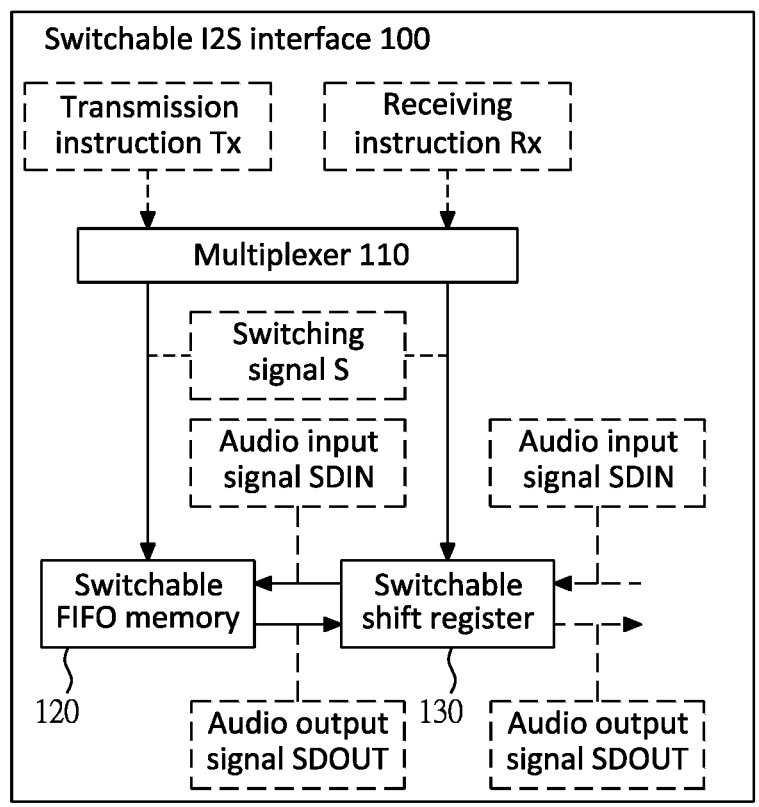
FIG. 2 is a first block diagram of a first embodiment of a switchable I2S interface of the present invention.

Please refer to FIG. 2, which is a first block diagram of a first embodiment of a switchable I2S interface of the present invention. As shown in FIG. 2, a switchable I2S interface 100 includes a multiplexer 110, a switchable FIFO memory 120 and a switchable shift register 130.

The multiplexer 110 can receive a transmission instruction Tx or a receiving instruction Rx, and generate a switching signal S according to the transmission instruction Tx or the receiving instruction Rx, and then transmit the switching signal S to the switchable FIFO memory 120 and the switchable shift register 130.

The switchable FIFO memory 120 is connected to the multiplexer 110, and can receive the switching signal S. The switchable FIFO memory 120 includes a transmission control circuit and a receiving control circuit, and according to the switching signal S, the switchable FIFO memory 120 can switch on the transmission control circuit to transmit an audio output signal SDOUT, or switch on the receiving control circuit to receive the audio input signal SDIN. According to the switching signal S generated in response to the transmission instruction Tx, the switchable FIFO memory 120 switches on the transmission control circuit. According to the switching signal S generated in response to the receiving instruction Rx, the switchable FIFO memory 120 switches on the receiving control circuit.

The switchable shift register 130 is connected to the switchable FIFO memory 120, and can receive and temporarily store the audio output signal SDOUT transmitted from the switchable FIFO memory 120, and further transmit the audio output signal SDOUT to an audio output device, such as a speaker.

The switchable shift register 130 can receive the audio input signal SDIN from an audio input device, such as a microphone, and temporarily store the audio input signal SDIN, and transmit the audio input signal SDIN to the switchable FIFO memory 120.

The switchable FIFO memory 120 is operated based on a first-in first-out queue, and a direction of the first-in first-out queue is determined by a higher-level logic circuit. Therefore, the transmission of the audio output signal to the audio output device (such as a speaker), and the transmission of the audio input signal from the audio input device (such as a microphone) to the switchable FIFO memory 120, are performed by the same logic and the same queue but in different directions.

Figure 3:
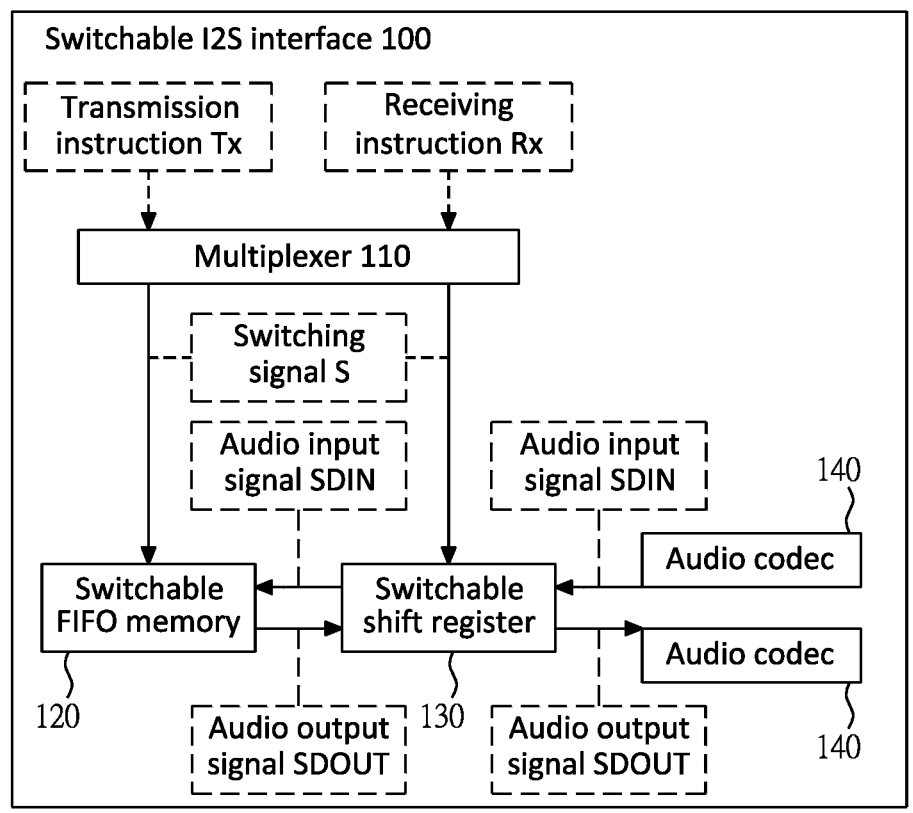
FIG. 3 is a second block diagram of a first embodiment of a switchable I2S interface of the present invention.

Please refer to FIG. 3, which is a second block diagram of a first embodiment of a switchable I2S interface of the present invention. As shown in FIG. 3, the switchable shift register 130 is connected to the plurality of audio codecs 140, each audio codec 140 transmits the audio input signal to the switchable shift register 130, or receives the audio output signal from the switchable shift register 130.

In an embodiment, each audio codec 140 can be an analog-to-digital converter or a digital-to-analog converter.

Furthermore, the audio input signal or the audio output signal can be transmitted between the switchable shift register 130 and one of the audio codecs 140 at a time point, and the audio input signal or the audio output signal can be transmitted between the switchable shift register 130 and another of the audio codecs 140 at a next time point. The switchable I2S interface 100 of the present invention can have three operational modes including an operational mode of outputting two audio signals, an operational mode of inputting two audio signals, and an operational mode of inputting an audio signal and outputting an audio signal, so as to achieve the purpose of using different audio devices at different time points.

It should be noted that the switchable FIFO memory 120 can be a 32-bit memory, and each of the audio input signal SDIN and the audio output signal SDOUT can be 16-bit data, so that the switchable FIFO memory 120 can selectively receive two audio input signals SDIN at the same time, or transmit two audio output signals SDOUT at the same time.

Figure 4:
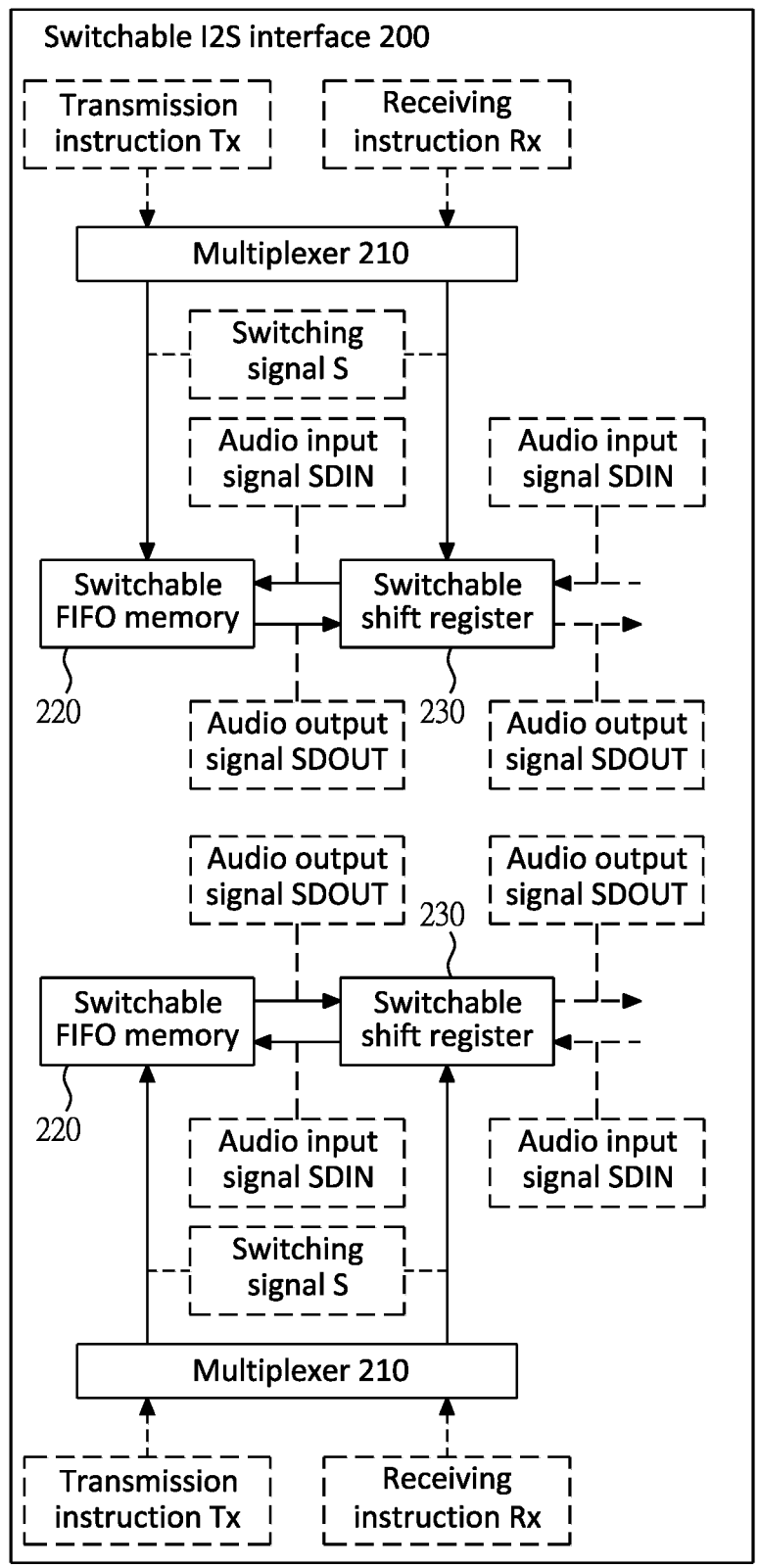
FIG. 4 is a first block diagram of a second embodiment of a switchable I2S interface of the present invention.

Besides the first embodiment, the present invention further provides a second embodiment for exemplary illustration. Please refer to FIG. 4, which is a first block diagram of a second embodiment of a switchable I2S interface of the present invention. As shown in FIG. 4, a switchable I2S interface 200 includes two multiplexers 210, two switchable FIFO memories 220, and two switchable shift registers 230.

Each of the two multiplexers 210 can receive the transmission instruction Tx or the receiving instruction Rx, and generate the switching signal according to the received instruction, and then transmit the switching signal S to the switchable FIFO memory 220 and the switchable shift register 230 corresponding thereto.

The two switchable FIFO memories 220 are connected to the two multiplexer 210 respectively, and can receive the switching signal S. Each of the two switchable FIFO memory 220 can include a transmission control circuit and a receiving control circuit. According to the switching signal S, the switchable FIFO memory 220 can switch on the transmission control circuit to transmit the audio output signal, or switch on the receiving control circuit to receive the audio input signal. In other words, the switchable FIFO memory 220 can switch on the transmission control circuit according to the switching signal S generated in response to the transmission instruction Tx, or switch on the receiving control circuit according to the switching signal S generated in response to the receiving instruction Rx.

Each of the two switchable shift registers 230 is connected to the switchable FIFO memory 220 corresponding thereto, and can receive and temporarily store the audio output signal SDOUT transmitted from the switchable FIFO memory 120, and further transmit the audio output signal to an audio output device, such as a speaker.

Alternatively, the switchable shift register 230 can receive and temporarily store the audio input signal SDIN, from an audio input device such as a microphone, and then transmit the audio input signal SDIN to the switchable FIFO memory 220.

The switchable FIFO memory 220 can be operated based on a first-in first-out queue, and an operational direction of the queue is determined by a higher-level logic circuit, so that the transmission of the audio output signal to audio output device (such as a speaker), and the transmission of the audio input signal from the audio input device to the switchable FIFO memory 220 (such as a microphone) are performed by the same logic and the similar queue but in different directions.

Figure 5:
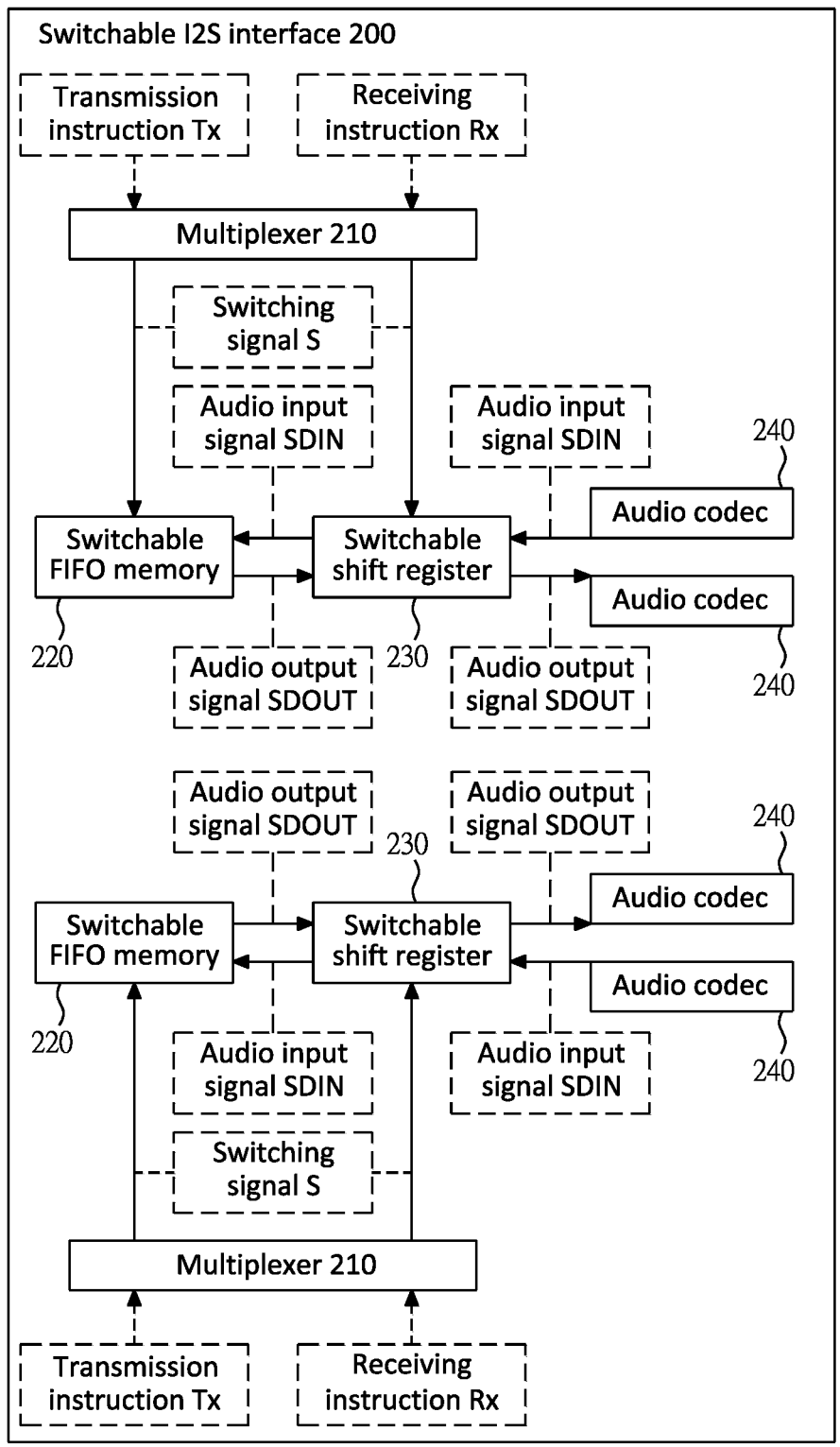
FIG. 5 is a second block diagram of a second embodiment of a switchable I2S interface of the present invention.

Please refer to FIG. 5, which is a second block diagram of a second embodiment of a switchable I2S interface of the present invention. As shown in FIG. 5, the switchable shift register 230 can be connected to a plurality of audio codecs 240, and each audio codec 240 can transmit the audio input signal to the switchable shift register 230 or receive the audio output signal from the switchable shift register 230.

Furthermore, each audio codec 240 can be an analog-to-digital converter or a digital-to-analog converter.

Furthermore, the audio input signal or the audio output signal can be transmitted between one of the two switchable shift registers 230 and one of the audio codecs 240 at a time point, and the audio input signal or the audio output signal can be then transmitted between the one of the two switchable shift registers 230 and another of the audio codecs 240 at a next time point. The switchable I2S interface 100 of the present invention has three operational modes including an operational mode of outputting two audio signals, an operational mode of inputting two audio signals, and an operational mode of inputting an audio signal and outputting an audio signal, so as to achieve the purpose of using different audio devices at different time points.

In summary, the switchable I2S interface of the present invention can switch the switchable FIFO memory to perform the receiving function or transmission function upon demand, so as to prevent the first-in first-out memory from idling; furthermore, since one I2S interface can be used to input or output two audio signals, the inputs or outputs of the two audio signals can be synchronized more efficiently; furthermore, the receiving function or transmission function can be switched to perform, so that the required amount of the I2S interfaces can be decreased, and the synchronization issue between the different I2S interfaces can be can reduced or eliminated, and the development time of the I2S and the cost of the device using the I2S interface can be reduced.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A switchable I2S interface, comprising:
   a multiplexer configured to receive a transmission instruction or a receiving instruction, and configured to generate a switching signal according to the received transmission instruction or receiving instruction;
   a switchable FIFO memory connected to the multiplexer and configured to receive a switching signal, and the switchable FIFO memory comprises a transmission control circuit and a receiving control circuit, wherein according to the switching signal the switchable FIFO memory selectively turns on at least one of the transmission control circuit to transmit an audio output signal and the receiving control circuit to receive an audio input signal; and
   a switchable shift register connected to the switchable FIFO memory and the multiplexer, the switchable shift register is configured to receive and temporarily store the audio output signal and to transmit the audio input signal to the switchable FIFO memory;
   wherein the switchable shift register is connected to a plurality of audio codecs, each of the plurality of audio codecs transmits the audio input signal to the switchable shift register, or receives the audio output signal from the switchable shift register;
   wherein the audio input signal or the audio output signal is transmitted between the switchable shift register and one of the plurality of audio codecs at a first time point, and the audio input signal or the audio output signal is transmitted between the switchable shift register and another of the plurality of audio codecs at a second time point next to the first time point, so that the switchable I2S interface has three operational modes including an operational mode of outputting two audio signals, an operational mode of inputting two audio signals, and an operational mode of inputting an audio signal and outputting an audio signal.

2. The switchable I2S interface according to claim 1, wherein each of the plurality of audio codecs is an analog-to-digital converter or a digital-to-analog converter.

3. The switchable I2S interface according to claim 1, wherein the switchable FIFO memory is a 32-bit memory, and each of the audio input signal and the audio output signal is 16-bit data, and the switchable FIFO memory selectively receives the two audio input signals or transmits the two audio output signals; and wherein the switchable FIFO memory is operated based on a first-in first-out queue, and a direction of the first-in first-out queue is determined by a level logic circuit.

4. A switchable I2S interface, comprising:

two multiplexers, wherein each of the two multiplexers is configured to receive a transmission instruction or a receiving instruction, and configured to generate a switching signal according to the received transmission instruction or the receiving instruction;

two switchable FIFO memories connected to the two multiplexers respectively, and configured to receive the switching signal, wherein each of the two switchable FIFO memories comprises a transmission control circuit and a receiving control circuit, and according to the switching signal selectively turns on at least one of the transmission control circuit to transmit an audio output signal and the receiving control circuit to receive an audio input signal; and two switchable shift registers connected to the two switchable FIFO memories and the two multiplexers respectively, and configured to receive and temporarily store the audio output signal and to transmit the audio input signal to the two switchable FIFO memories respectively;

wherein each of the two switchable shift registers is connected to a plurality of audio codecs, and each of the plurality of audio codecs transmits the audio input signal to the switchable shift register corresponding thereto or receives the audio output signal from the switchable shift register corresponding thereto;

wherein the audio input signal or the audio output signal is transmitted between one of the two switchable shift registers and one of the plurality of audio codecs at a first time point, and the audio input signal or the audio output signal is transmitted between the one of the two switchable shift registers and another of the plurality of audio codecs at a second time point next to the first time point, so that the switchable I2S interface has three operational modes including an operational mode of outputting two audio signals, an operational mode of inputting two audio signals, and an operational mode of inputting an audio signal and outputting an audio signal.

5. The switchable I2S interface according to claim 4, wherein each of the plurality of audio codecs is an analog-to-digital converter or a digital-to-analog converter.

6. The switchable I2S interface according to claim 4, wherein each of the two switchable FIFO memories is a 32-bit memory, and one of the audio input signal and the audio output signal is 16-bit data, and each of the two switchable FIFO memories selectively receives the two audio input signals, or transmits the two audio output signals; and wherein each of the switchable FIFO memories is operated based on a first-in first-out queue, and a direction of the first-in first-out queue is determined by a level logic circuit.

* * * * *